United States Patent
Chuang et al.

(10) Patent No.: US 6,591,672 B2
(45) Date of Patent: Jul. 15, 2003

(54) CONDITION SENSOR OF PNEUMATIC TIRE

(75) Inventors: Marvin Chuang, Shinshing Chiu (TW); Ching Hsiung Kuo, Chianjen Chiu (TW)

(73) Assignee: Lite-On Automotive Corporation, Taiwan (TW)

( * ) Notice: Subject to any disclaimer, the term of this patent is extended or adjusted under 35 U.S.C. 154(b) by 0 days.

(21) Appl. No.: 09/941,567

(22) Filed: Aug. 30, 2001

(65) Prior Publication Data

US 2002/0046599 A1 Apr. 25, 2002

(30) Foreign Application Priority Data

Sep. 2, 2000 (TW) .................................... 89118096 A (51) Int. Cl.[7] .............................................. B60C 23/02
(52) U.S. Cl. ..................................................... 73/146.8
(58) Field of Search ................................. 73/146, 146.2, 73/146.3, 146.8

(56) References Cited

U.S. PATENT DOCUMENTS

| 4,048,614 A | | 9/1977 | Shumway |
| 5,285,189 A | * | 2/1994 | Nowicki et al. ............ 340/447 |
| 5,844,131 A | * | 12/1998 | Gabelmann et al. ....... 73/146.8 |
| 6,055,855 A | | 5/2000 | Straub |
| 6,101,870 A | * | 8/2000 | Kato et al. ................. 73/146.8 |

* cited by examiner

Primary Examiner—Hezron Williams
Assistant Examiner—Corey D. Mack (57) ABSTRACT

A condition sensor of pneumatic tire is configured to be attached on a pneumatic tire of a vehicle, and the pneumatic tire has a rim with a rim bed. The condition sensor comprises a sensor circuit for detecting the condition of the tire, a power source for supplying the sensor circuit with electric power; and a housing having a cover portion and a base portion, in which the base portion is used to receive the sensor circuit and the power source. The cover portion is provided with an arc-concave surface having a convexity, in which the arc-concave surface is in arc-line contact with the rim bed and the convexity can be used to adjust the relationship position between the housing and the rim bed.

22 Claims, 6 Drawing Sheets

CONDITION SENSOR OF PNEUMATIC TIRE

BACKGROUND OF THE INVENTION

1. Field of the Invention

This invention relates to a sensor of pneumatic tire, and more specifically to a condition sensor of pneumatic tire for securely attaching to the rim of the tire.

2. Description of the Related Art

It is well known in the prior art that a variety of devices can be used to inspect the pressure of the pneumatic tire of vehicle, such as U.S. Pat. No. 4,048,614 entitled "Low Tire Pressure Warning Device", issued to Shumway on Sep. 13, 1997, which discloses a tire warning device for pneumatic tires of a vehicle. The tire warning device is mounted to the wheel rim and has an actuatable radio transmitter, a power source, a switch, and a diaphragm means. The radio transmitter can be actuated to warn the driver when the pressure of the tire is below a predetermined low pressure. The warning device described above only warns the driver of the low pressure of the tire, and is constructed with complex structure which is not adapted to the modern vehicle.

U.S. Pat. No. 5,844,131 entitled "Tire Pressure Sensor Apparatus For A Pneumatic Tire Of A Vehicle", issued to Gabelmann et al. on Dec. 1, 1998, discloses a pressure sensor device comprising a housing having at least two base elements for resting on a rim bed of a tire rim and for adjustably supporting the housing in a mounted state. As mentioned above, since the rim bed is cylindrical or barrel shape, the housing is supported to the rim bed by the two base elements when it is mounted on the rim bed. However, due to the vehicle jolting along, such a two-point contact is often loosened and the housing cannot be securely mounted on the rim bed. Besides, the sensor device is mounted on the rim of the tire by the two base elements as well as a tire valve and a hollow screw attached thereto, but this arrangement needs cooperating with three contact points, and thus it is difficult to install and to mount the sensor device on a variety of rims. Also, the antenna member is necessary for the pressure sensor, and it is extended from the housing. When the tire is repaired, the antenna member will be often damaged by the repairing tools, and then the pressure sensor will be replaced.

Moreover, U.S. Pat. No. 6,055,855 entitled "Tire Pressure Sensor Wheel Attachment Apparatus", issued to Straub on May 2, 2000, discloses an apparatus for mounting a pressure sensor on a rim of a vehicle wheel, in which the apparatus comprises a pressure sensor and a threaded fastener, and the pressure sensor can be mounted on the rim of the wheel by the threaded fastener and a tire valve stem. The mounting effect only from the tire valve stem cannot provide sufficient support to meet the requirement of the apparatus. Furthermore, this apparatus includes a spherical surface to be adjustably attached on the rim, but this spherical surface will substantially decrease the stability of the apparatus.

Therefore, the tire pressure sensor as described hereinbefore cannot be securely mounted on the rim of the wheel, and a need exists therefor to provide a suitable pressure device to be securely attached to the rim of the tire of vehicle so as to inspect the tire condition at any time.

SUMMARY OF THE INVENTION

It is the primary object of the present invention to provide a condition sensor of a pneumatic tire to inspect the condition of the tire, in which the condition sensor can be securely mounted to the rim of the tire and interact with receiver means outside of the tire.

It is another object of the present invention to provide a condition sensor of a pneumatic tire to inspect the condition of the tire, in which the condition sensor is mounted to the rim of the tire and is constructed as a relatively compact structure such that the condition sensor will not be damaged by the tire repairing tools.

It is a further object of the present invention to provide a condition sensor of a pneumatic tire to inspect the condition of the tire, in which the condition sensor has an adjustable structure so as to facilitate the securely attachment of the condition sensor on the rim of the tire.

In order to achieve the above objects, the condition sensor of pneumatic tire according to the present invention is configured to be attached on a pneumatic tire of a vehicle, and the pneumatic tire has a rim with a rim bed. The condition sensor comprises a sensor circuit to detect the condition of the tire, a power source to supply the sensor circuit with electric power; and a housing having a cover portion and a base portion, in which the base portion is used to receive the sensor circuit and the power source. The cover portion is provided with an arc-concave surface having a convexity, in which the arc-concave surface is in arc-line contact with the rim bed and the convexity can be used to adjust the relationship position between the housing and the rim bed.

According to one aspect of the present invention, the condition sensor of pneumatic tire further comprises a valve stem cavity having a hole and a tire valve stem, the rim of the tire having a tire valve hole, and the condition sensor being adjustably mounted on the tire valve hole by means of the valve stem cavity.

According to another embodiment of the present invention, the condition sensor of pneumatic tire is configured to be attached on a pneumatic tire of a vehicle, and the pneumatic tire having a rim with a rim bed. The condition sensor comprises a sensor circuit to dectect the condition of the tire, a power source to supply the sensor circuit with electric power, a housing to receive the sensor circuit and be mounted on the rim bed, the housing has a cover portion and a base portion, in which the base portion is used to receive the sensor circuit and the power source and comprise two grooves, and the cover portion is provided with a valve stem cavity and a tire valve stem, and the rim having a tire valve hole; and two one-way sliders to cooperate with the two grooves such that the one-way slider can slide inside the groove in one way and the condition sensor can be securely mounted on the tire valve hole by means of the tire valve stem through the valve stem cavity and the two one-way sliders.

According to another aspect of the present invention, the condition sensor of pneumatic tire further comprises an antenna to transmit radio signal and interact with receiver means outside of the tire, the antenna is arranged alone the surface of the base portion to reduce the probability of the antenna being damaged.

According to the present invention, since the condition sensor of pneumatic tire is provided with an arc-concave surface to fit with the rim bed of the pneumatic tire, the condition sensor can be securely attached to the rim of the tire. Also, the condition sensor has an antenna member without any protruding structure, and thus the antenna member of the condition sensor will not be damaged during repairing of the tire.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
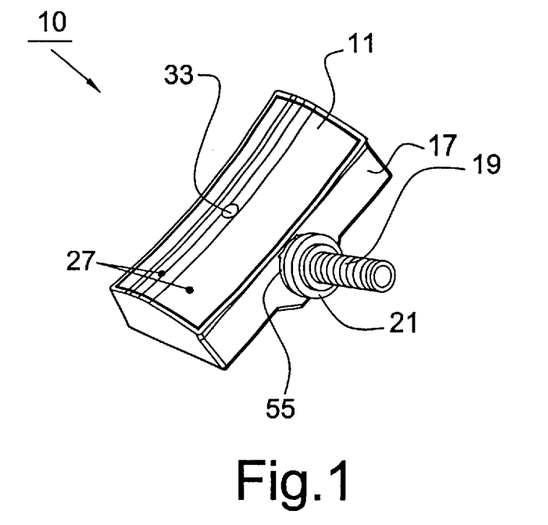
FIG. 1 is a perspective view of a condition sensor of a pneumatic tire of a vehicle according to an embodiment of the present invention.
Figure 2:
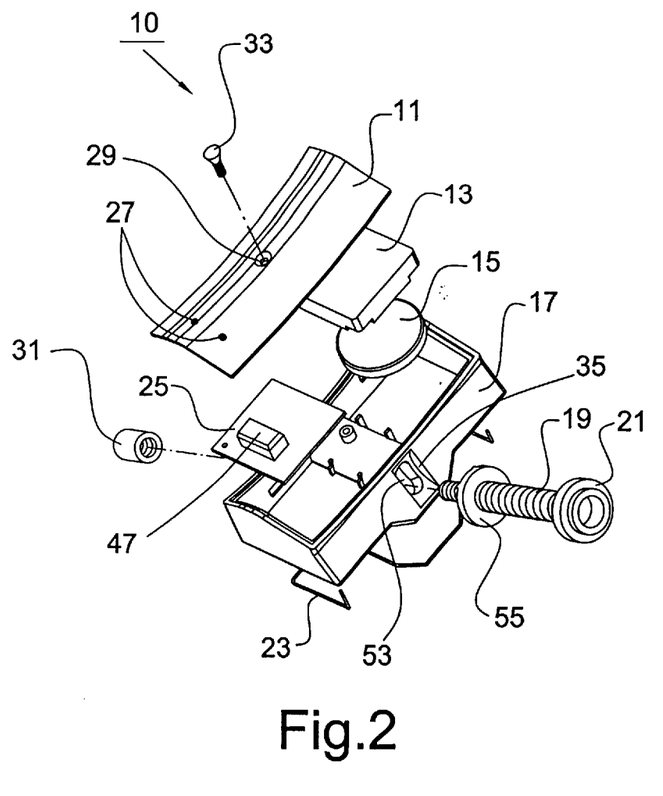
FIG. 2 is a perspective exploded view of the condition sensor of a pneumatic tire shown in FIG. 1.
Figure 3:
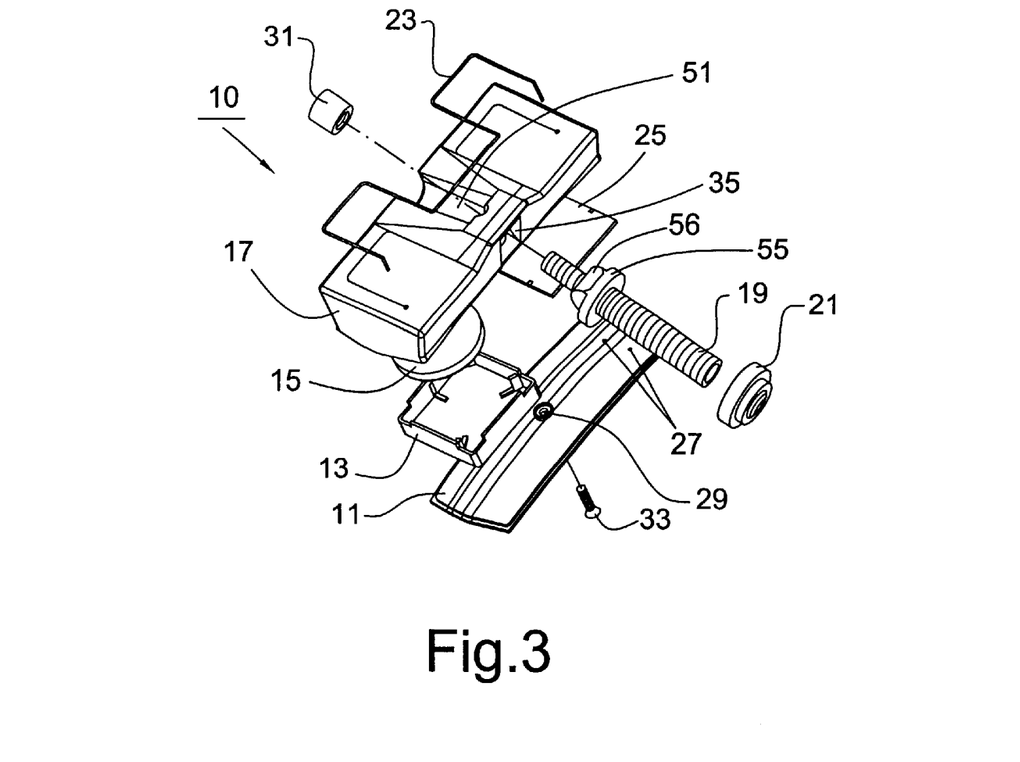
FIG. 3 is a perspective view of the condition sensor of a pneumatic tire shown in FIGS. 1 and 2 from an alternate direction.

Now referring to FIGS. 1, 2, and 3, they depict a condition sensor 10 of the pneumatic tire of vehicle according to the present invention. The condition sensor 10 includes a housing having a base portion 17 and a cover portion 11 attached to the base portion 17 by a bolt 33 and a thread hole 29. The base portion 17 substantially includes two compartments for receiving a sensor circuit 25 and a battery seat 13 with a battery 15 deposed therein, respectively.

The central portion of the base portion 17 is provided with a value stem cavity 51 having an elongated hole 53 with a tire valve stem 19 extending therethrough. The tire valve stem 19 has a stopper 55 of which one end is provided with a substantially arc-shape shoulder 56 and the elongated hole 53 is also provided with an arc-shape shoulder 35 such that the tire valve stem 19 pivots with relation to the base portion 17 on the curvature centrum of the arc-shape shoulder 35, when the tire valve stem 19 is mounted into the elongated hole 53 and fixed by a nut 31. Also, the nut 31 further comprises a washer 38, and both of the nut 31 and the washer 38 have indented grain so as to allow the nut 31 securely being attached on the tire valve stem 19 without loosing due to the vehicle jolting alone.

Figure 4:
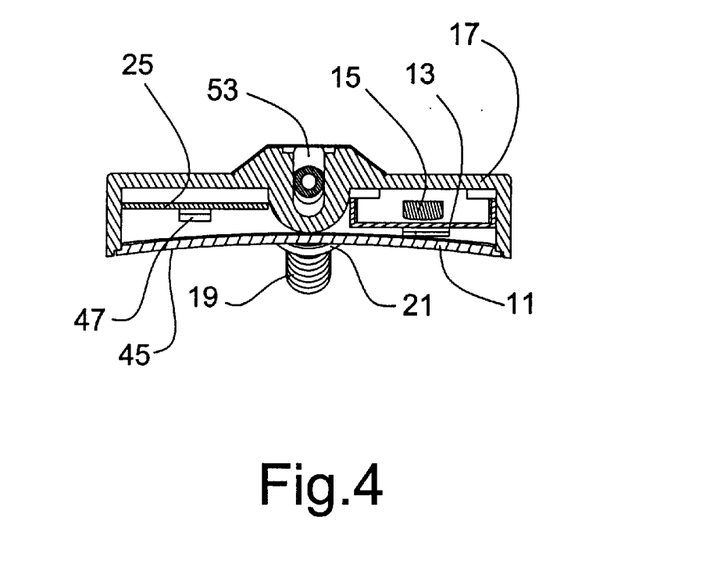
FIG. 4 is a cross-section view of the condition sensor of a pneumatic tire according to the embodiment of the present invention.

Now referring to FIG. 4, it depicts a cross-section of the condition sensor 10 of the pneumatic tire. Since the cover portion 11 of the housing is contacted with a rim bed when the condition sensor 10 is attached on the vehicle wheel (described in detail hereinafter), the surface of the printing circuit board of the sensor circuit 25 on which the electronic elements is attached must face the cover portion 11 to keep the stability of the sensor circuit 25 from the effect of the centrifugal force during driving. The sensor 25 substantially includes a sensor application-specific integrated circuit (ASIC) 47, the ASIC is available from model IB01290 manufactured by the LITE-ON Inc., which can be used to dectect the pressure and the temperature.

Moreover, it will be appreciated by those skilled in this art that a tire pressure sensor known in the related art has a sensor application-specific integrated circuit (ASIC), and the sensor ASIC and the battery are encapsulated together therein, so the entire tire pressure sensor should be replaced when the battery is dead. Alternatively, since the condition sensor 10 according to this invention is provided with the battery seat 13 for mounting the battery 15 and the cover portion 11 is removable mounted on the base portion 17, the battery 15 can be securely mounted onto the base portion 17 by means of the battery seat 13 and is replaceable.

Figure 5:
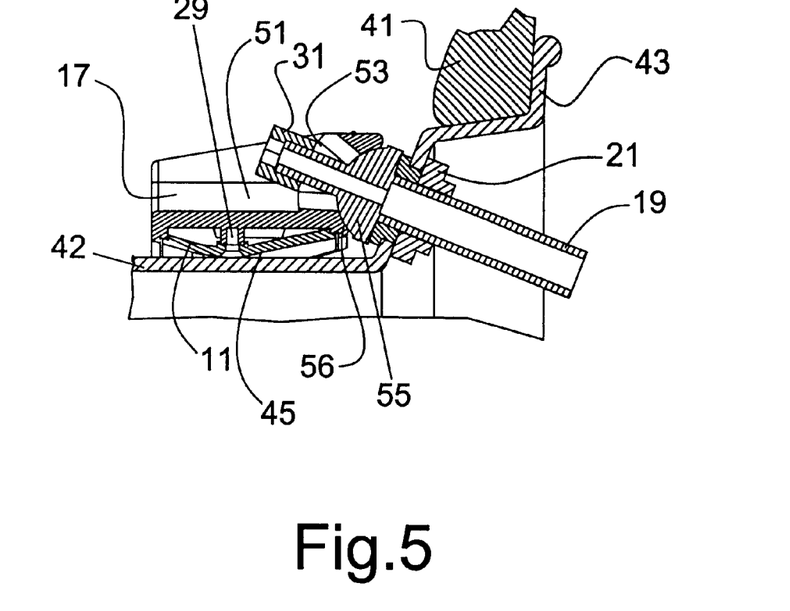
FIG. 5 is a cross-section view of the condition sensor mounted on a rim of a pneumatic tire according to the embodiment of the present invention.

Now referring to FIG. 5, the condition 10 of the pneumatic tire of the vehicle is mounted on a rim 43 by the tire valve stem 19 and a nut 21. Referring to FIG. 4 and 5, the cover portion 11 of the condition sensor 10 is provided with an arc-concave surface 45 having a convexity. The curvature of the arc-concave portion of the arc-concave surface 45 having a convexity is the same as that of the rim bed 42 of the tire, so the surface 45 will be in arc-line contact with the rim bed 42 of the rim 43 when the condition sensor 10 is attached on the rim 43 such that the condition sensor 10 can be more securely mounted on the rim 43.

Moreover, it will be appreciated by those skilled in this art that a tire pressure sensor known in the related art is provided with a tire valve stem having a spherical stopper, so the tire valve stem shall be affixed by a specific tool when a nut is screwed thereon and hence it is difficult to install the tire pressure sensor. The tire valve stem 19 of the condition sensor 10 according to the present invention has an arcuated shoulder 56 to keep the tire valve stem 19 from rotating, when the nut 31 is screwed thereon to mount the tire valve stem 19, such that the condition sensor 10 can be rapidly mounted on the rim 43.

Figure 6:
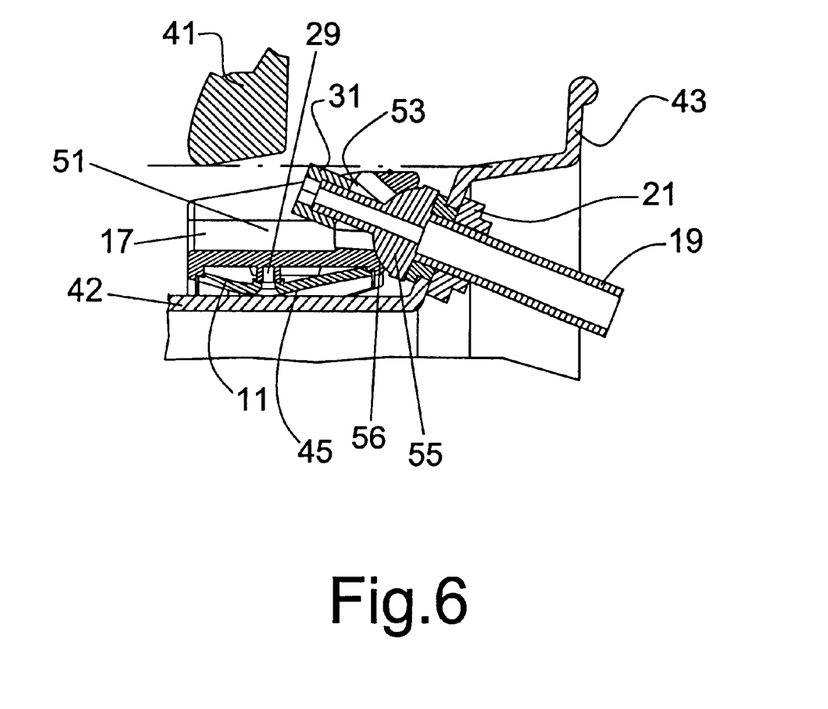
FIG. 6 is a cross-section view of the condition sensor mounted on a rim of a pneumatic tire according to the embodiment of the present invention.

Also, the sensor circuit 25 of the condition sensor 10 is interacting with receiver device by a radio signal to inspect the tire, so the sensor circuit 25 must have an antenna 23 to transmit the radio signal. As shown in FIGS. 2 and 3, the antenna 23 is constructed as a specific shape arranged alone the surface of the base portion 17 of the condition sensor 10. As shown in FIGS. 5 and 6, the antenna 23 is set on the surface of the base portion 17. When the tire 41 is removed from the rim 43, the tire 41 will be moved relative to the condition sensor 10 (showing in the FIG. 6) and the antenna will not be damaged.

As mentioned above, the condition sensor 10 is used to detect the condition of a pneumatic tire, such as pressure and temperature, and thus the cover portion 11 of the condition sensor 10 according to the present invention further comprises two through holes 27 such that the condition of the tire can be sensed by the sensor circuit 25. It will be appreciated by those skilled in this art that there is moisture inside of the pneumatic tire. In the conventional sensor of the pneumatic tire, a specific material membrane is often used to keep the circuit of the sensor from effect of the moisture in the tire while the sensor can detect the pressure and the temperature of the tire. For this reason, the diameter of the though hole 27 of the condition 10 according to the present invention is preferably less than 0.5 mm, and the perimeter surface of the hole 27 is provided with protrusion (not shown) such that the sensor 25 can detect the condition of the tire while keeping the moisture from entering the condition sensor 10.

Figure 7:
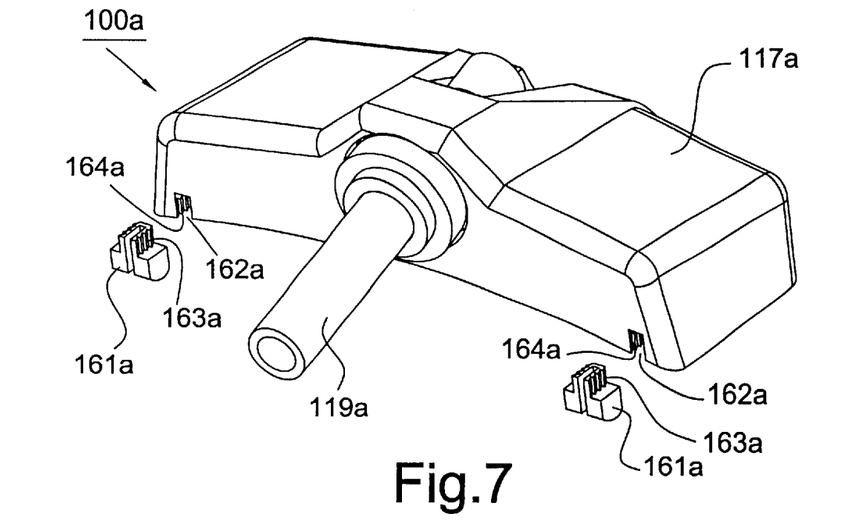
FIG. 7 is a perspective view of the condition sensor of a pneumatic tire according to another embodiment of the present invention.

Furthermore, referring to FIG. 7, it depicts a condition sensor 100a of the pneumatic tire of vehicle according to another embodiment of the present invention. The condition sensor 100a is similar to the condition sensor 10, and the similar elements have been designated by the similar reference numerals. The condition sensor 100a further comprises two one-way sliders 161a, and the base portion 117a of the condition sensor 100a has two grooves 162a. The two one-way sliders 161a are provided with indent pawls 163a cooperating with indent notches on the two grooves 162a such that the two one-way sliders 161a can slide inside the two grooves 162a in one way direction. Therefore, while the condition sensor 100a is attached on the rim bed of the tire and the cover portion is in arc-line contact with the rim bed, the two one-way slides 161a will be further slided into the two grooves 162a to further securely mount the condition sensor 100a so as to avoid the condition sensor 100a vibrating during driving.

Figure 8:
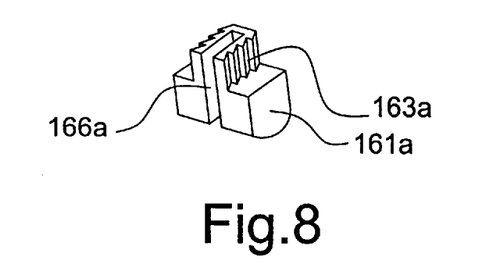
FIG. 8 is an enlarged perspective view of the one-way slider of the condition sensor of a pneumatic tire shown in FIG. 7.

Also, as shown in FIG. 8, the one-way slider 161a further comprises a slot 166a, which is used to increase the flexibility thereof when the the one-way slider 161a slides into the groove 162a.

Figure 9:
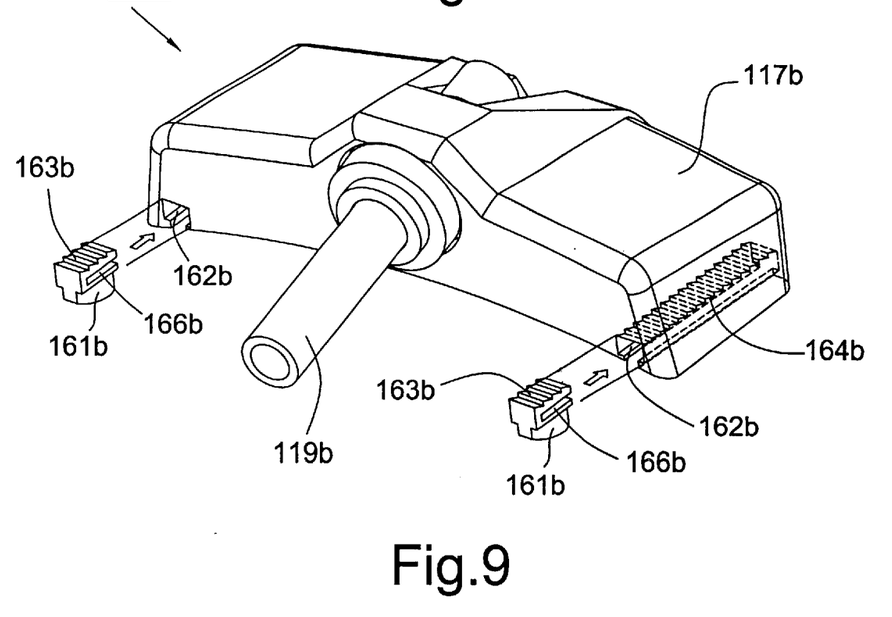
FIG. 9 is a perspective view of the condition sensor of a pneumatic tire according to also another embodiment of the present invention.

Now referring to FIG. 9, it depicts a condition sensor 100b of the pneumatic tire of vehicle according to a third embodiment of the present invention. The condition sensor 100b is similar to the condition sensor 100a, and the similar elements have been designated by the similar reference numerals. The condition sensor 100b has another type of one-way sliders 161b that is similar to the one-way sliders 161a, and the only difference is that the indent pawls 163b of the one-way slider 161b is deposited on the top of the one-way slider 161b and the indent notches 164b is also deposited on the top of the groove 162b (shown as the dash lines in FIG. 9) such that the two one-way sliders 161b can slide inside the two grooves 162b in one way, respectively.

Figure 10:
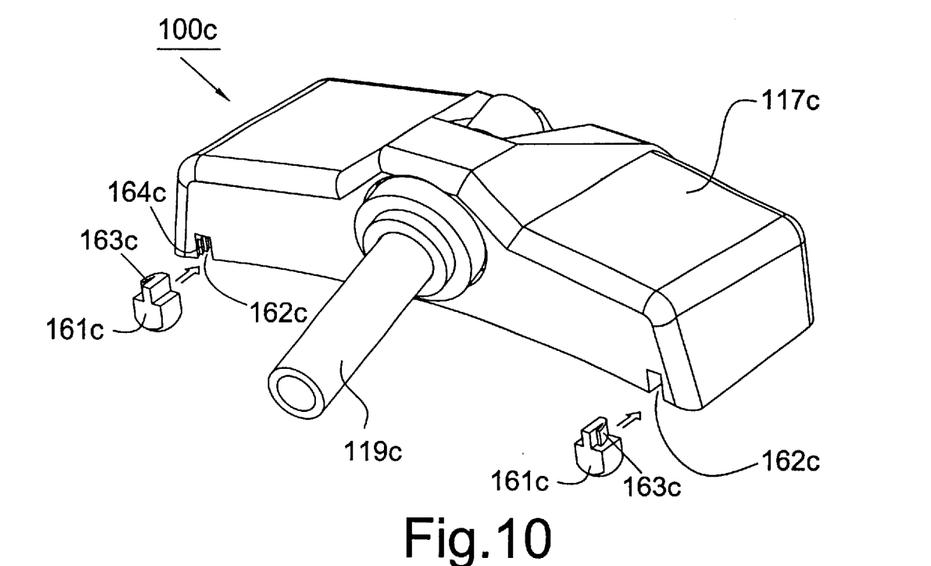
FIG. 10 is a perspective view of the condition sensor of a pneumatic tire according to still another embodiment of the present invention.

Now referring to FIG. 10, it depicts a condition sensor 100c of the pneumatic tire of vehicle according to a further embodiment of the present invention. The condition sensor 100c is similar to the condition sensor 100a, and the similar members have been designated by the similar reference numerals. The condition sensor 100c has another type of one-way sliders 161c that is similar to the one-way sliders 161a, and the only difference is that the one-way slider 161c has a fin extended from one side thereof and the indent notches 164b is deposited on the only one side of the groove 162b such that the two one-way sliders 161c can slide inside the two grooves 162c in one way, respectively.

Figure 11:
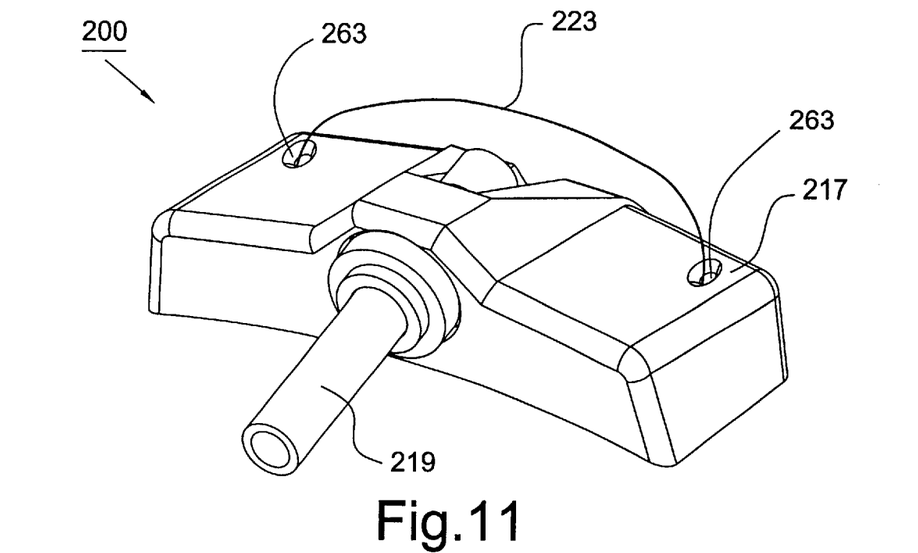
FIG. 11 is a perspective view of the condition sensor of a pneumatic tire according to also another embodiment of the present invention.
Figure 12:
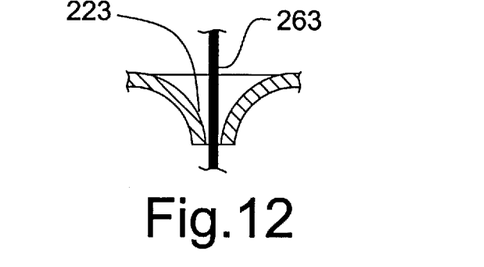
FIG. 12 is an enlarged cross-section schematic view of the flaring recess of the condition sensor shown in FIG. 11.

Referring to FIGS. 11 and 12, they depict a condition sensor 200 of the pneumatic tire of vehicle according to another embodiment of the present invention. The condition sensor 200 is similar to the condition sensor 100, and the similar elements have been designated by the similar reference numerals. The condition sensor 200 further comprises two flaring recesses 263, which is deposed on the junction of the antenna 223 and the base portion 217. When the tire is repaired, the flaring recess 263 is used to keep the antenna 223 from damaging due to unduly bending.

Figure 13:
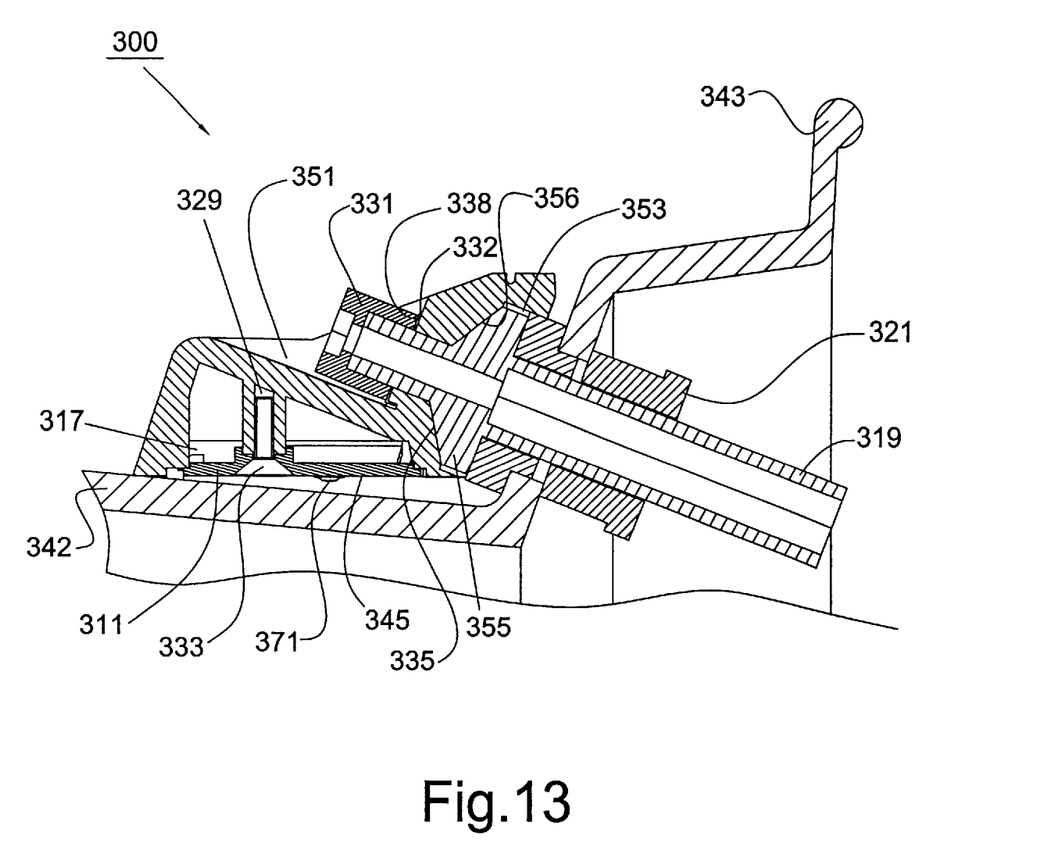
FIG. 13 is a cross-section view of the condition sensor of a pneumatic tire mounted on the rim of the pneumatic tire according to another embodiment of the present invention.

Now referring FIG. 13, it depicts a condition sensor 300 of the pneumatic tire of vehicle according to another embodiment of the present invention. The condition sensor 300 is similar to the condition sensor 100, and the similar elements have been designated by the similar reference numerals. The condition sensor 300 comprises a valve stem cavity 351, which has a conical hole 353 with a tire valve stem 319 extending therethrough. The tire valve stem 319 comprises a stopper 355. The one end of the stopper 355 has a substantially conical shoulder 335 and the conical hole 353 also has an arcuated shoulder 335 such that the tire valve stem 319 can be mounted by a nut 331 when it is inserted into the conical hole 353. Also, the nut 331 further comprises a washer 332, and the nut 331 and the washer 332 have indented grain 338 so as to allow the nut 331 securely attaching on the tire valve stem 319 without loosing due to the vehicle jolting alone.

As mentioned above, the condition 300 is used to detect the condition of a pneumatic tire, such as pressure and temperature, and thus the cover portion 311 of the condition sensor 10 according to the present invention further comprises two through holes such that the condition of the tire can be detected by the sensor circuit. It will be appreciated by those skilled in this art that there is moisture inside of the pneumatic tire. The diameter of the though hole of the condition 300 according to the present invention is preferably less than 0.5 mm, and the perimeter surface of the hole 27 is provided with protrusion such that the sensor 25 can detect the condition of the tire while keeping the moisture from entering the condition sensor 300.

Furthermore, the condition sensor 300 further comprises two one-way sliders, and the base portion 317 of the condition sensor 300 has two grooves. As described hereinbefore, the two one-way sliders can cooperating with the two grooves such that the two one-way sliders can slide inside the two grooves in one way. Therefore, while the condition sensor 300 is attached on the rim bed of the tire, the two one-way slides will be further slided into the two grooves to further securely mount the condition sensor 300 so as to keep the condition sensor 300 from loosing due to the vehicle jolting alone.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A condition sensor of pneumatic tire configured to be attached on a pneumatic tire of a vehicle, and the pneumatic tire having a rim with a rim bed, the condition sensor comprising:

a sensor circuit for detecting the condition of the tire;

a power source for supplying the sensor circuit with electric power; and a housing having a cover portion and a base portion, the base portion carrying the sensor circuit and the power source, and the cover portion being provided with an arc-concave surface having a convexity, in which the arc-concave surface is adapted to be brought in arc-line contact with the rim bed when the housing is mounted thereon, with the convexity used to adjust a relative position between the housing and the rim bed.

2. The condition sensor of pneumatic tire of claim 1, further comprising a valve stem cavity having a hole and a tire valve stem, the rim of the tire comprising a tire valve hole, and the condition sensor being adjustably mounted on the tire valve hole by means of the valve stem cavity.

3. The condition sensor of pneumatic tire of claim 2, wherein the tire valve stem further comprises a stopper having an arc-shape shoulder, the valve stem cavity has an arc-shape shoulder, and the hole of the valve stem cavity is an elongated hole such that the tire valve stem pivots with relation to the base portion on the axis of the arc-shape shoulder and the arc-shape shoulder keeps the tire valve stem from rotating during attaching of the tire valve stem, to adjustable mount the condition sensor on the tire valve hole.

4. The condition sensor of pneumatic tire of claim 1, wherein the sensor further comprises an antenna coupled to the sensor circuit to transmit radio signals therefrom and interact with a receiver outside the tire, the antenna is arranged along a surface of the base portion to reduce the probability of the antenna damage.

5. The condition sensor of pneumatic tire of claim 1, wherein the sensor circuit further comprises an antenna to transmit radio signal and interact with receiver means outside of the tire, and the base portion further comprises a flaring recess deposed on the junction of the antenna and the base portion to keep the antenna from breaking due to unduly bending.

6. The condition sensor of pneumatic tire of claim 1, wherein the cover portion further comprises at least a through hole such that the sensor circuit can detect the condition of the tire.

7. The condition sensor of pneumatic tire of claim 6, wherein the diameter of the through hole is less than 0.5 mm.

8. The condition sensor of pneumatic tire of claim 7, wherein the perimeter surface of the through hole of the cover portion further comprises a protrusion structure.

9. The condition sensor of pneumatic tire of claim 1, further comprising at least an one-way slider, the base portion of the condition sensor comprising at least one groove, and the one-way slider being cooperating with the groove such that the one-way slider slides irreversibly inside the groove in one way and the condition sensor is further securely mounted.

10. The condition sensor of pneumatic tire of claim 9, wherein the one-way slider further comprises indent pawls, the groove further comprises indent notches, and the indent pawls cooperate with the indent notches such that the one-way slider can slide inside the groove in one way and the condition sensor can be further securely mounted.

11. The condition sensor of pneumatic tire of claim 9, wherein the one-way slider further comprises a slot to increase the flexibility thereof.

12. The condition sensor of pneumatic tire of claim 9, wherein the one-way slider further comprises a fin extended from one side thereof, and the groove further comprises indent notches on one side thereof, and the fin cooperates with the indent notches such that the one-way sliders slides irreversibly inside the groove in one way and the condition sensor is further securely mounted.

13. The condition sensor of pneumatic tire of claim 1, wherein the power source is a battery, and the battery is replaceable.

14. The condition sensor of pneumatic tire of claim 13, wherein the battery further comprises a battery seat for securely receiving the battery in the housing.

15. The condition sensor of pneumatic tire of claim 1, wherein the sensor circuit comprises a circuit board and a plurality of electronic elements, in which the surface of the printing circuit board of the sensor circuit on which the electrical elements is attached faces the cover portion to keep the stability of the sensor circuit from the effect of the centrifugal force during driving.

16. The condition sensor of claim 1, wherein the base portion comprises a bottom wall and opposite side walls extending, at a angle, from the bottom wall, the arc-concave surface of the cover portion spanning over the bottom wall continuously extends from one of the side walls to the other.

17. The condition sensor of claim 16, further comprising an antenna coupled to the sensor circuit for transmitting radio signals therefrom and interacting with a receiver outside the tire, the antenna being arranged on an outer surface of the bottom wall.

18. A condition sensor of pneumatic tire configured to be attached on a pneumatic tire of a vehicle, and the pneumatic tire having a rim with a rim bed, the condition sensor comprising:

a sensor circuit for detecting the condition of the tire;

a power source for supplying the sensor circuit with electric power;

a housing having a cover portion and a base portion, the base portion receiving the sensor circuit and the power source, and comprising at least one groove, and the cover portion provided with a valve stem cavity;

a tire valve stem sized to extend through a tire valve hole in the rim; and at least an one-way sliders cooperating with the groove such that the one-way slider slides irreversibly inside the grooves in one way, and the condition sensor is securely mounted on the rim bed by means of the tire valve stem extending through the valve stem cavity and the one-way slider.

19. The condition sensor of pneumatic tire of claim 18, wherein the one-way slider further comprises indent pawls, the groove further comprises indent notches, and the indent pawls cooperate with the indent notches such that the one-way slider slides irreversibly inside the groove in one way and the condition sensor is further securely mounted.

20. The condition sensor of pneumatic tire of claim 18, wherein the one-way slider further comprises a slot to increase the flexibility thereof.

21. The condition sensor of pneumatic tire of claim 18, wherein the one-way slider comprises a fin extended from one side thereof, and the groove comprises indent notches on one side thereof, and the fin cooperates with the indent notches such that the one-way slider slides irreversibly inside the groove in one way and the condition sensor is further securely mounted.

22. The condition sensor of pneumatic tire of claim 18, wherein the valve stem cavity of the housing further comprises a conical hole, the tire valve stem comprises a stopper, and the conical hole cooperates with the stopper such that the condition sensor is further securely mounted on the rim via the tire valve hole.

* * * * *